UNITED STATES PATENT OFFICE.

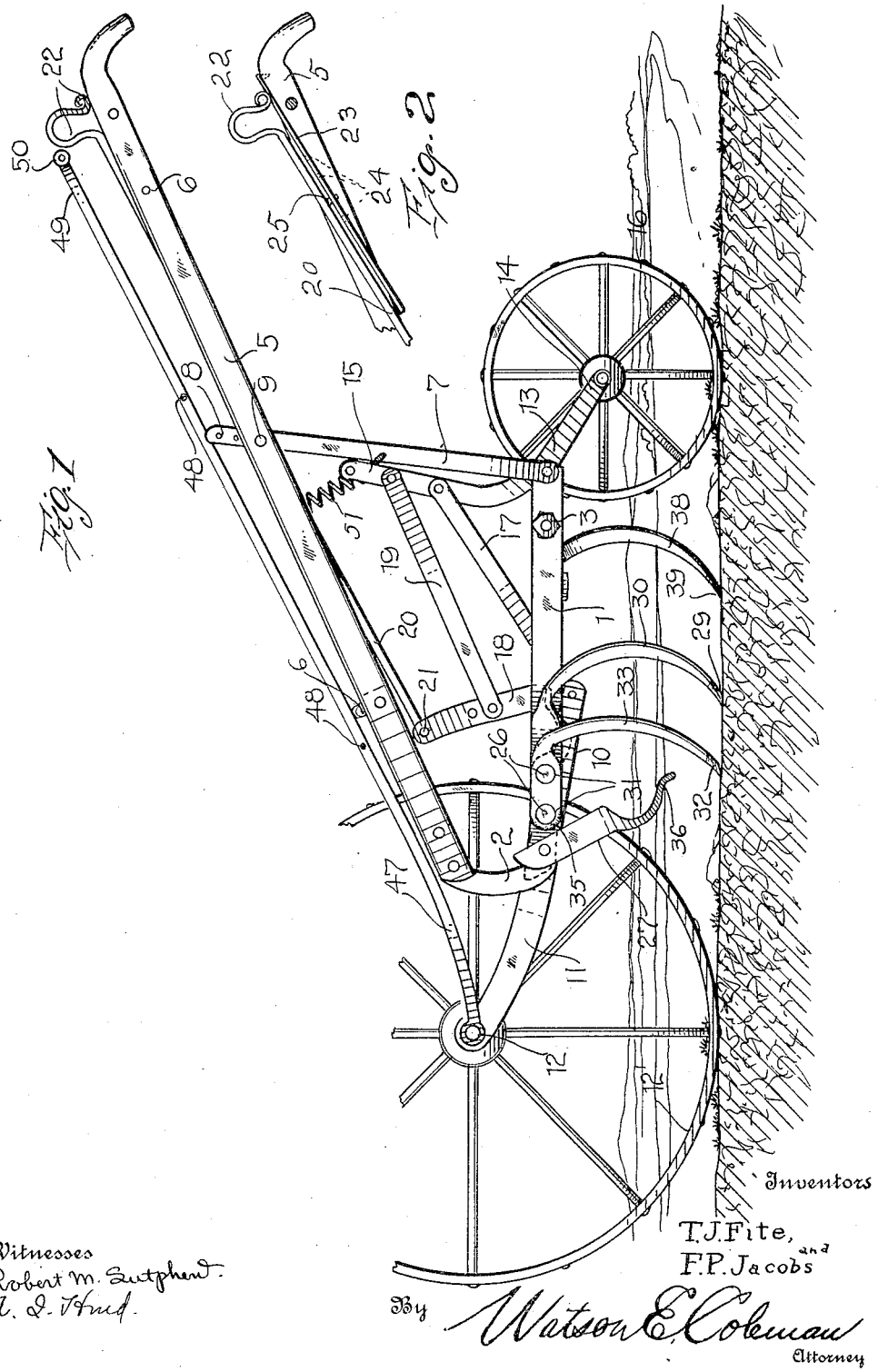

THOMAS J. FITE AND FRANK P. JACOBS, OF HAMERSVILLE, OHIO.

CULTIVATOR.

1,084,142.  Specification of Letters Patent.  Patented Jan. 13, 1914.

Application filed January 31, 1913. Serial No. 745,460.

*To all whom it may concern:*

Be it known that we, THOMAS J. FITE and FRANK P. JACOBS, citizens of the United States, residing at Hamersville, in the county of Brown and State of Ohio, have invented certain new and useful Improvements in Cultivators, of which the following is a specification, reference being had to the accompanying drawings.

This invention comprehends certain new and useful improvements in cultivators, and more particularly to that class of cultivators which may be manually operated, and are generally designated as garden cultivators.

An object of this invention is the provision of a cultivator comprising a frame and a front and rear wheel, and means whereby the frame may be adjusted vertically, to cause the cultivator teeth or other tools which may be secured in the frame to operate at greater or less depths, according to the character of the work to be performed.

A further object of this invention is the provision of a cultivator of this class in which both the front and rear wheels of the device may be vertically adjusted simultaneously, and means for maintaining the wheels in any of their adjusted positions.

With these and other objects in view, our invention consists of certain novel constructions, combinations, and arrangements of parts to be hereinafter more fully described, claimed, and illustrated in the accompanying drawings, in which—

Figure 1 is a view in side elevation of a cultivator constructed in accordance with an embodiment of our invention; and Fig. 2 is a fragmentary side elevation of the upper end of one of the handles, as disclosed in the preceding figure, and illustrating the adjustable connection of the operating rod therewith.

Referring more particularly to the drawings, the frame of the cultivator comprises a pair of side bars 1, which are bent at their forward ends to form uprights 2. The side bars 1 are connected to each other by rods 3 which are threaded on their opposite ends for the reception of nuts or other fastening devices, and sleeves 4 are mounted on the rods between the bars, whereby the bars are suitably spaced from each other. Connected to the upper end of the uprights are rearwardly inclined handle bars 5, which are suitably connected by cross bars 6, and connected to the rear end of each of the bars 1 are vertically extending supporting bars 7 which are provided with a plurality of apertures 8 in their upper ends, pins 9 being adapted to pass through the apertures into the handle bars 5, whereby the handle bars may be maintained at any desired angle of inclination with relation to the bars 1.

A bracket 10 comprising a substantially U-shaped bar, is pivotally mounted intermediate of its ends between the forward ends of the bars 1 of the frame, the free outer ends of the bracket being curved upwardly, as at 11, and have journaled therein an axle 12, on which is mounted the front wheel 12′ of the cultivator. A rear bracket 13 is pivotally connected between the rear ends of the bar 1, the bracket comprising a pair of spaced rearwardly extending arms 14 which are integrally connected at their forward ends and extend upwardly within the frame, as at 15. Journaled between the rear ends of the arms 14 of the bracket is a rear wheel 16, which is relatively of less diameter than the front wheel 12, and pivotally connecting the upwardly extending bar 15 and the bight portion of the U-shaped bar, is a link bar 17. Loosely mounted on the front connecting rod 3 between the sleeve 4 and said bar 1, is an angular bar 18, and pivotally connected at one end to the intermediate portion of the bar 18 is a connecting link 19, the opposite end of which is pivotally connected to the upper end of the rod 15 of the rear bracket. An operating rod 20 is pivotally connected at its forward end to the upper end of the bar 18, as at 21, the operating rod 20 extending rearwardly and upwardly from said frame and is curved at its inner end, as at 22 to form a hand hold whereby the rod may be easily operated. Secured to one of the handles 5 near the upper end thereof, is a bar 23, which is provided with a plurality of openings 24 for the reception of a depending pin 25 which is formed on the lower face of the operating rod 20 adjacent the upper end thereof. The rod 20 is maintained in engagement with the plate 23 through the medium of the retractable spring 51 having one end portion suitably secured to the rod 20, while the opposite end portion of such spring is suitably secured to the adjacent supporting bar 7.

Formed on the outer face of each bar 1 near the forward end thereof are a pair of spaced outwardly projecting pins 26, and pivotally mounted on each of the arms forwardly of the pins is a clamping member 27. The clamping members 27 comprise a flat strip of metal which is offset near the forward end thereof, as at 28, the space between the offset portion of the clamping members and the outer face of the bars being of substantially the same distance as the length of the pins. A cultivator tooth 29 which is provided with a shank 30, which is formed with spaced openings 31, is disposed on the outer face of the bars 1, the apertures 31 in the shank of each tooth being adapted to engage the teeth 26 formed on the bars. A pair of cultivator teeth 32 is disposed on the pins outwardly of the teeth 29, the shanks 33 of the teeth 32 being offset, as at 34, whereby the teeth 32 are disposed out of longitudinal and lateral alinement with the teeth 29. The front end of each shank 33 is beveled, as at 35, whereby the clamps 27 may be disposed over the outer faces of the teeth 32 and frictionally engage the shanks of the teeth 32 whereby the teeth will be maintained in position on the pins 26. Suitable finger pieces 36 are formed integral with the clamping levers, so that the levers may be readily operated when desired. Formed on the inner face of one of the bars 1 intermediate of its ends, are a pair of inwardly projecting pins 37, which are adapted to receive the apertured shank 38 of a cultivator tooth 39, the shank of the tooth being offset inwardly, as at 40, whereby the teeth 39 will be disposed in longitudinal alinement with the wheels between the teeth 29 and 32 on the opposite sides of the frame. A clamping lever 27 is also pivotally mounted on the inner face of the bar adjacent the pins, the lever being adapted to frictionally engage the shank 38 of the tooth to secure it in position on the bar.

If desired, a pair of rods 47 may be pivotally mounted at one of their ends on the opposite ends of the axle 12 of the front wheel, the intermediate portions of the rods being suitably spaced by cross rods 48, and the other ends of the rods converging, as at 49, the extremities of the rods being connected to a suitable handle 50. When the rods extend rearwardly of the frame, the cultivator may be pushed along the ground by pressure against the handle bar 50, and when the bars extend forwardly of the frame, the cultivator may be pulled by grasping one of the cross bars 48. From this construction, it will be seen that we have provided means for manually operating the cultivator either from the rear or forward ends thereof.

In the practical use of our cultivator, the frame is adjusted vertically so that the cultivator teeth or other implements, will be disposed in the ground to the desired depth, and the cultivator moved along the surface of the ground so that tools secured to the cultivator frame will operate in the ground in the usual manner. When it is desired to adjust the depth of the tools in the ground, the operating rod 20 is raised so as to disengage the tooth 25 from the aperture 24 with which it may be engaged, and the operating rod is moved forwardly or rearwardly, whereupon the bar 18 will be oscillated. The bar 15 will be moved by the link 19, and as the link bar 17 pivotally connects the bar 15 of the bearing and the medial portion of the bearing 10, it will be seen that the frame will be raised and lowered upon movement of the operating rod 20. If desired, a contractile spring 51 may be secured at one end to the operating rod 20 and at its other end to one of the uprights 7, whereby the pin 25 will be normally held in engagement with one of the apertures 24 to prevent accidental vertical movement of the wheels.

Having thus fully described our invention, what we desire to claim and secure by Letters Patent is:

1. A device of the character described comprising a frame, intermediately pivoted brackets mounted in the opposite ends of said frame, wheels mounted within said brackets, ground engaging implements carried by the frame, a link bar pivotally connecting the inner end portions of the brackets, a bar pivotally carried by the frame, a link in pivotal engagement with such bar and one of the bearings, and means for imparting movement to such bar.

2. A device of the character described comprising a frame, intermediately pivoted brackets mounted in said frame at the opposite ends thereof, wheels mounted in the outer portions of the brackets, ground engaging implements carried by said frame, a link having its opposite end pivotally connected to the inner portions of the brackets, a bar pivotally carried by the frame, a link connecting such bar and the inner portion of one of the brackets, an endwise movable rod in engagement with the bar, coacting means carried by the rod and frame for holding the rod against movement, and retractable means interposed between the rod and frame for normally holding the coacting means of the frame and rod in operative relation.

In testimony whereof we hereunto affix our signatures in the presence of two witnesses.

THOMAS J. FITE.
FRANK P. JACOBS.

Witnesses:
ALBERT G. FITE,
RUFUS L. FITE.

Copies of this patent may be obtained for five cents each, by addressing the "Commissioner of Patents, Washington, D. C."